United States Patent
Kennedy

(10) Patent No.: US 7,036,524 B2
(45) Date of Patent: May 2, 2006

(54) WASTE DISPOSAL SYSTEM FOR RECREATIONAL VEHICLES

(76) Inventor: James Kennedy, 46924 298th St., Beresford, SD (US) 57004

( * ) Notice: Subject to any disclaimer, the term of this patent is extended or adjusted under 35 U.S.C. 154(b) by 2 days.

(21) Appl. No.: 10/828,127

(22) Filed: Apr. 20, 2004

(65) Prior Publication Data

US 2004/0256007 A1    Dec. 23, 2004

Related U.S. Application Data

(63) Continuation-in-part of application No. 10/197,168, filed on Jul. 15, 2002, now abandoned.

(60) Provisional application No. 60/305,573, filed on Jul. 16, 2001.

(51) Int. Cl.
*F16K 37/00* (2006.01)
*A01G 25/09* (2006.01)

(52) U.S. Cl. ............ 137/559; 137/355.12; 137/335.16; 137/899; 138/89; 138/110; 138/121

(58) Field of Classification Search ............... 137/899, 137/355.12, 355.16, 559; 138/110, 114, 138/89, 119, 121
See application file for complete search history.

(56) References Cited

U.S. PATENT DOCUMENTS

| | | | |
|---|---|---|---|
| 2,915,081 A * | 12/1959 | Warren | 137/899 |
| 3,496,959 A | 2/1970 | Wolfe et al. | 137/344 |
| 3,623,500 A | 11/1971 | Hoy | 137/344 |
| 3,712,331 A | 1/1973 | Otto | 137/355.16 |
| 3,730,228 A | 5/1973 | Gibbs, Sr. | 138/106 |
| 3,811,462 A | 5/1974 | Feliz | 137/344 |
| 3,860,978 A | 1/1975 | Wirth | 4/207 |
| 4,102,523 A | 7/1978 | Finnell | 248/49 |
| 4,180,102 A | 12/1979 | Larkin | 138/106 |
| 4,223,702 A | 9/1980 | Cook | 138/106 |
| 4,228,978 A | 10/1980 | Rand | 248/49 |
| 4,231,595 A | 11/1980 | Knutsen | 285/38 |
| 4,650,224 A | 3/1987 | Smith | 285/165 |
| 4,779,650 A | 10/1988 | Sargent et al. | 137/899 |
| 4,854,349 A | 8/1989 | Foreman | 138/89 |
| 5,247,974 A * | 9/1993 | Sargent et al. | 141/287 |
| 5,323,813 A | 6/1994 | Barrett | 137/899 |
| 5,431,455 A | 7/1995 | Seely | 285/61 |
| D385,248 S | 10/1997 | Spiegel | D12/400 |
| 5,897,083 A | 4/1999 | Johnson | 248/75 |
| 5,904,183 A * | 5/1999 | Leech | 138/110 |
| 5,971,438 A | 10/1999 | Johnson | 285/12 |
| 6,135,140 A * | 10/2000 | Grandinetti | 137/362 |

* cited by examiner

*Primary Examiner*—A. Michael Chambers
(74) *Attorney, Agent, or Firm*—Schwegman, Lundberg, Woessner & Kluth, P.A.

(57) ABSTRACT

A sewage draining system for a recreational vehicle. A flexible drainage hose extends from the distal end of sewage pipe on an RV, and a rigid sleeve carries the drainage hose in a first stowed position in which the hose is fully contained in the sleeve and in a second drainage position. The sleeve is pivotably connected at one end near the distal end of the sewer pipe so that it can swing outwardly from the vehicle.

8 Claims, 6 Drawing Sheets

WASTE DISPOSAL SYSTEM FOR RECREATIONAL VEHICLES

CROSS-REFERENCE TO RELATED APPLICATIONS

This application is a continuation-in-part and claims priority of invention under 35 U.S.C. §120 from U.S. application Ser. No. 10/197,168, filed Jul. 15, 2002 now abandoned, which claimed the benefit under 35 U.S.C. 119(e) of U.S. Provisional Application Ser. No. 60/305,573 filed Jul. 16, 2001, both of which are incorporated herein by reference in their entireties.

FIELD OF THE INVENTION

The present invention pertains to waste disposal systems for recreational vehicles.

BACKGROUND OF THE INVENTION

Many recreational vehicles such as travel trailers include on-board toilet facilities that include waste holding tanks. These tanks are emptied from time to time, typically into sewage disposal system such as holding tanks or sewer systems that are provided at recreational vehicle camp grounds, truck stops, or other service facilities.

Typically, a recreational vehicle carries with it a sewage hose that can be sealably attached at one end to an outlet port of an on-board sewage tank, with the free end draining into the sewage disposal system. In recreational vehicle parks, the sewage disposal systems often include an inlet port that is normally covered when not receiving sewage. When emptying the on-board sewage tanks, the cover is removed from the inlet port and it is coupled to the free end of the sewage hose to create a seal between the free end and the inlet port. Sewage can thus be drained from the on-board tanks into the disposal system with a minimum of spillage or leakage of sewage or sewer gases. After the sewage is dumped, the sewage hose is typically flushed by emptying "dirty water" tanks into the sewage disposal system using the same process. These dirty water tanks contain relatively clean water refuse that is collected from showers or sinks in the recreational vehicle. Thus, the sewage hose is at least partially cleaned using the "dirty water" prior to the time that it needs to be re-stowed on the vehicle.

As you might expect, emptying the sewage tanks of a recreational vehicle and handling the sewage hose are at best a mildly unpleasant tasks. Accordingly, it is readily imagined that even small improvements in this process would be readily welcomed by recreational vehicle owners and operators.

SUMMARY OF THE INVENTION

The present invention provides an improved method and apparatus for emptying a sewage tank on a recreational vehicle or other conveyance.

DETAILED DESCRIPTION OF THE INVENTION

In the following detailed description of the embodiments of the invention, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that changes may be made without departing form the scope of the present invention. The following detailed description is, therefore, not to be taken in a limiting sense, and the scope of the present invention is defined only by the appended claims.

Figure 1:
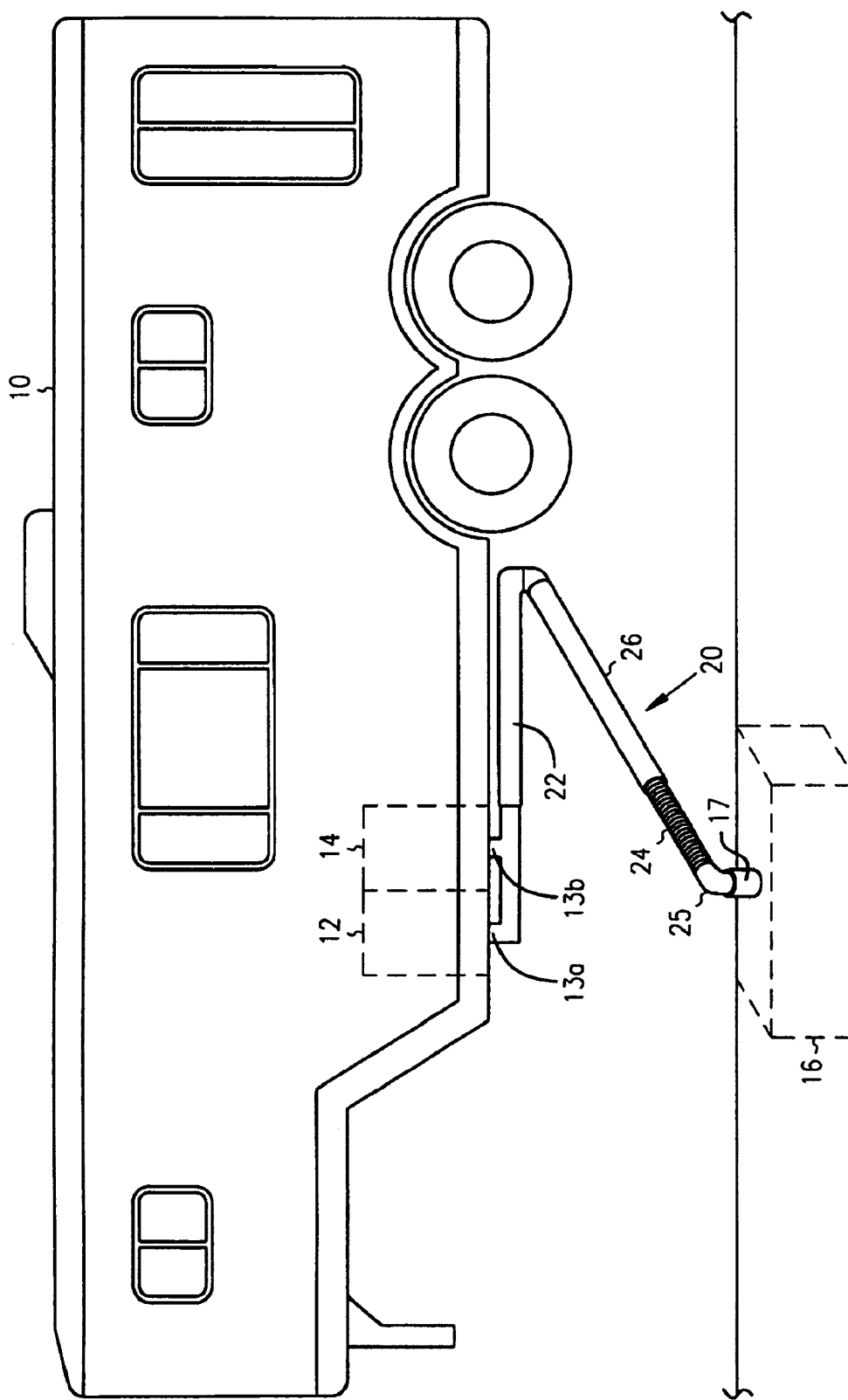
FIGS. 1–4 illustrate an RV sewage drainage system according to one embodiment of the present invention.

Referring now to FIG. 1, there is illustrated a side view of a recreational vehicle (RV) 10. RV 10 includes first and second sewage tanks 12 and 14, each including an outlet port, that are configured to drain through a sewage drainage system 20 into a sewage disposal system 16 having an inlet port 17. Disposal system 16 may be a conduit to a community sewage treatment center such as an in-ground sewer pipe, or it may be a large sewage holding tank that is used to hold sewage until it is transferred to another location. Alternatively, disposal system 16 may be a septic tank.

Figure 2:
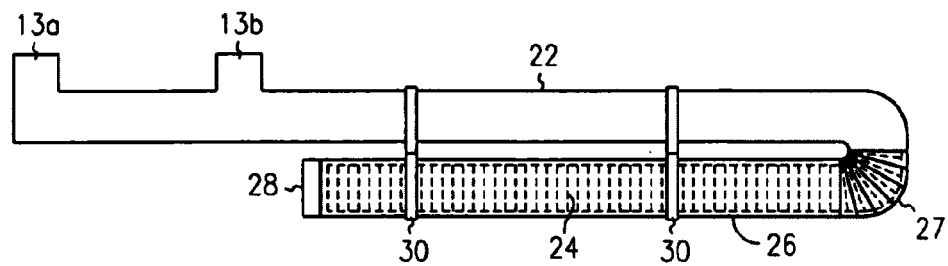
Figure 3:
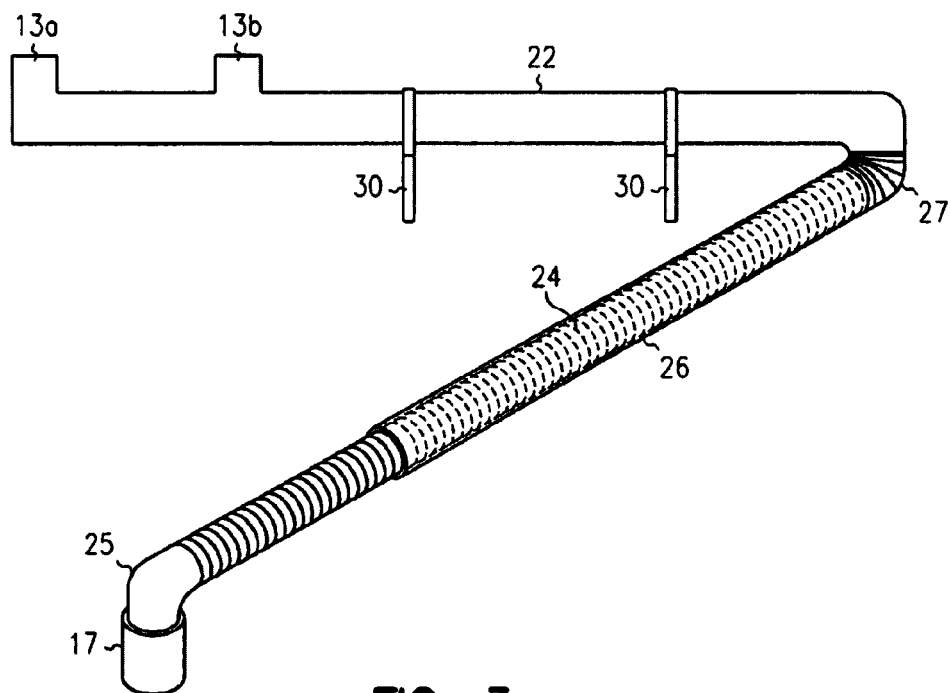
Figure 4:
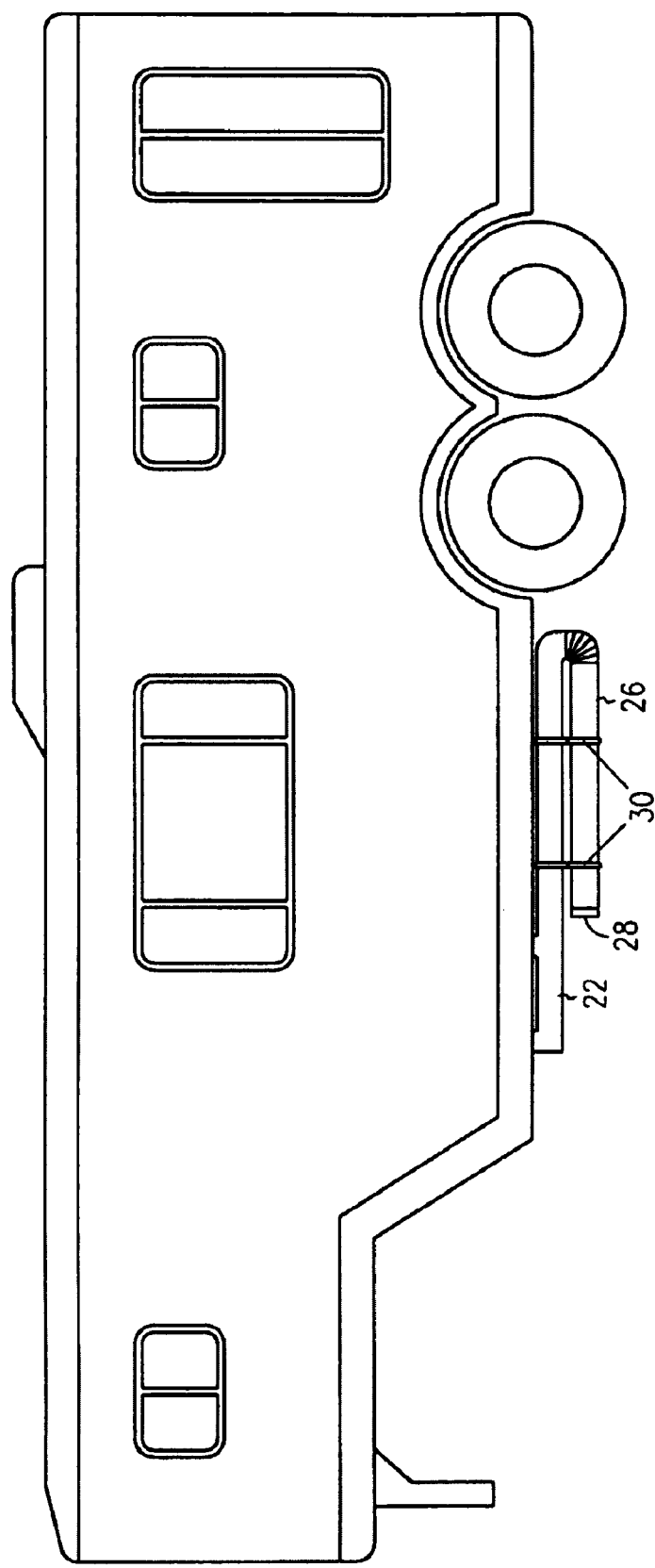

In one example embodiment, one of the tanks 12 or 14 contains toilet waste, while the other contains "dirty water" collected from sinks and showers on-board the RV 10. Drainage system 20 includes a first sewage pipe 22 mounted in a fixed position along the side or bottom of RV 10. A proximate end of the pipe 22 is adapted to receive sewage from either outlet port of the tanks 12 and 14 through a respective valves 13a or 13b. In this manner, either tank 12 or 14 may be drained through sewage pipe 22. Disposal system 20 further includes a flexible and stretchable drainage hose 24 that is connected on a proximate end to the distal end of sewage pipe 22 (see FIG. 2), with the distal end having a drain opening 25 through which sewage is conveyed to the sewage disposal system 16. Hose 24, which in one embodiment can be compressed and expanded along its longitudinal axis, may be constructed of any combination of suitable materials such as wire, rubber and/or plastic, passes through and is supported by a support member such as a rigid hose sleeve pipe 26 (shown in cut-away view in FIGS. 2 and 3). In one example embodiment pipe 26 is formed from PVC pipe. Hose sleeve pipe 26 is hingedly or pivotably mounted on one end proximate the end of fixed position pipe 22 to allow it to move freely between a stowed or carrying position such as illustrated in FIG. 4, and a tank drainage or extended position such a shown in FIG. 1.

In one example embodiment, the proximate end of the hose sleeve pipe 26 is fastened to the distal end of the sewage pipe with a flexible portion or section 27, for example, formed from a length of rubber hose. One or more holders, such as carrying brackets 30 are provided so that hose sleeve pipe 26 can be stowed alongside and proximate to sewage pipe 22. Other techniques, such as chains mounted to the bottom of the RV, can also be used to hold up sleeve pipe 26. A cap 28 is provided to close up the end of hose sleeve pipe 26 when it is stowed.

In operation, hose sleeve pipe 26 carries, supports and protects flexible hose 24 when stowed using brackets 30. When it is desired to empty the sewage tanks 12 and 14, sleeve pipe 26 is lifted or moved away from brackets 30 and the free or distal end swung outwardly from the RV 10 toward a sewer drop of a sewage disposal system 16.

In one example embodiment, the length of sleeve pipe 26 is approximately in the range of 3–8 feet, so that it reaches a substantial part of the distance from the point of attachment to the RV 10 to the sewer drop. When the distal end of sleeve pipe 26 is near the drop, end 28 is removed from pipe 26 and hose 24 is pulled out from pipe 26, stretching or expanding along its longitudinal axis. The free or distal end of hose 24 is then coupled into or positioned proximate the sewer drop or inlet port of the sewage disposal system 16. The sewage tanks are then emptied by opening valves 13a and 13b. Preferably, the toilet waste is emptied first, followed by the dirty water, so that the residue of the toilet waste is flushed from sewer pipe 22 and hose 24 with the dirty water sewage.

Figure 5:
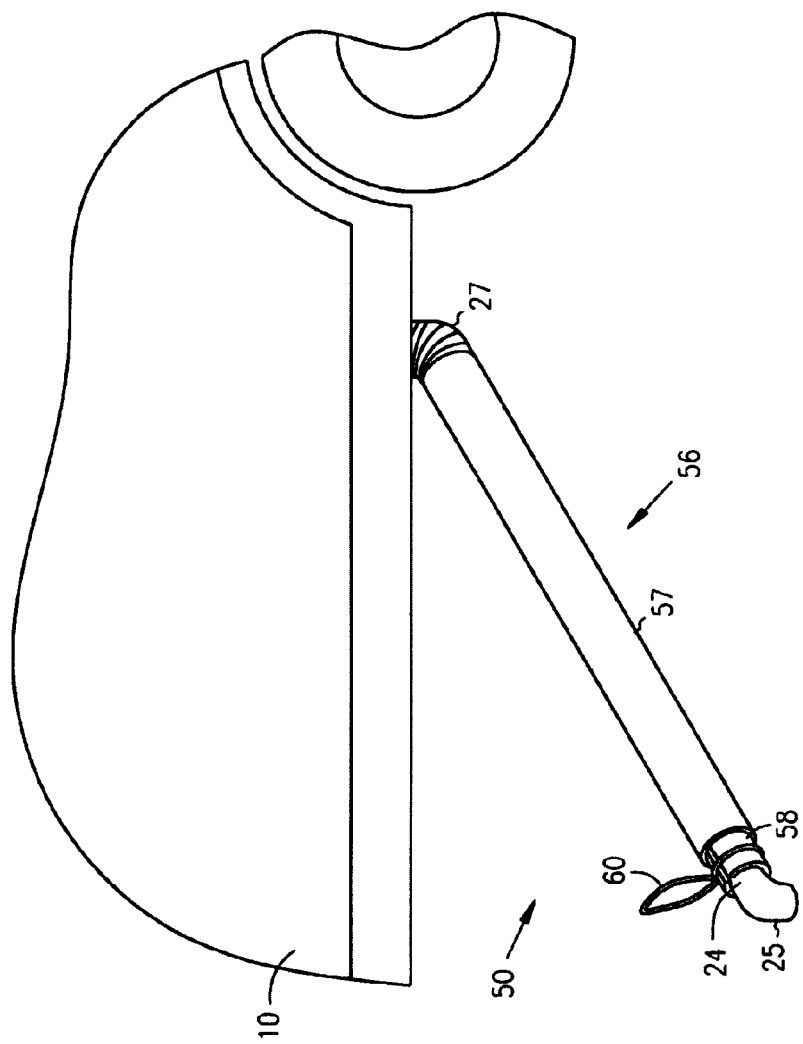
FIGS. 5 and 6 show an RV sewage drainage system according to one embodiment of the present invention.
Figure 6:
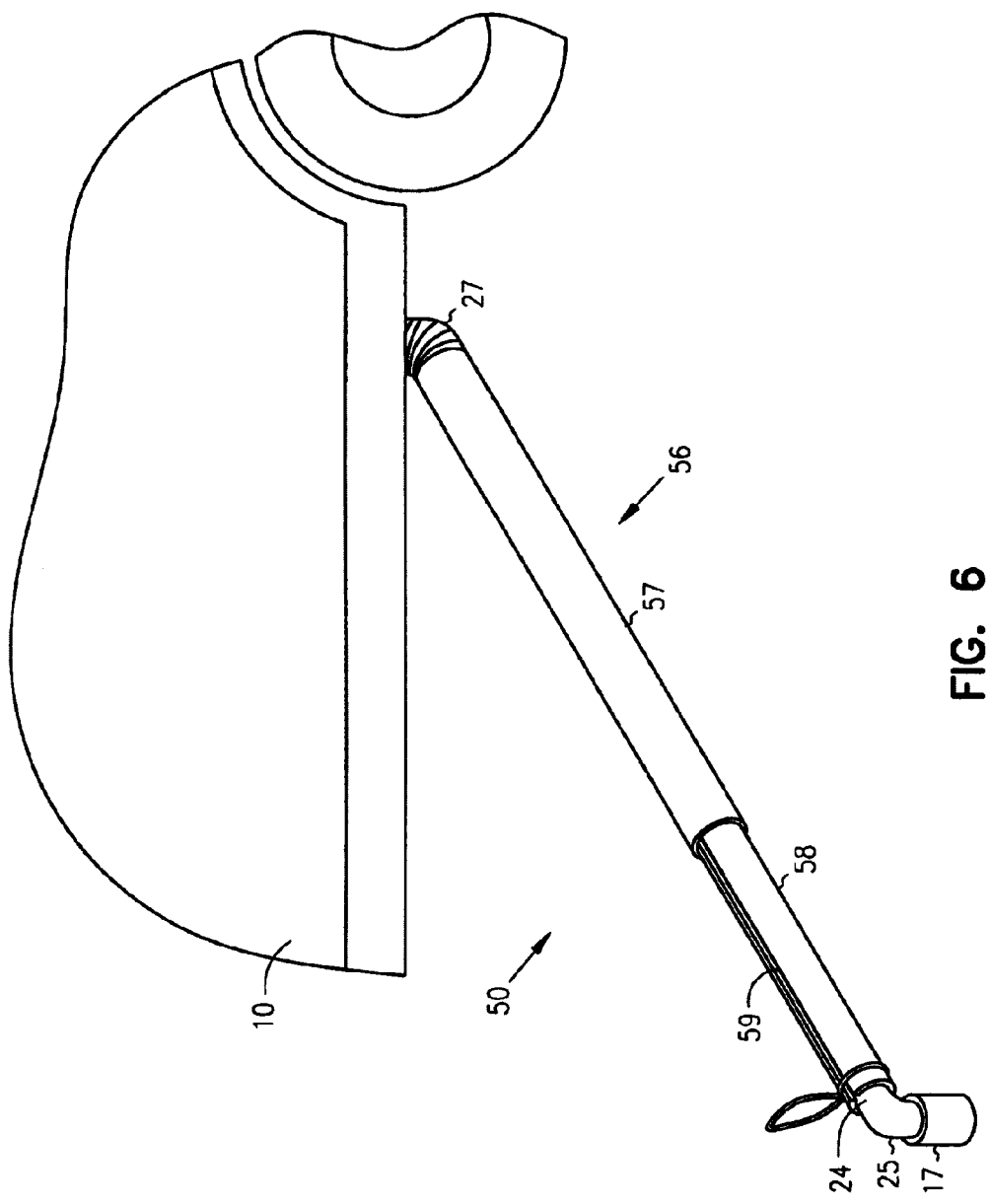

FIGS. 5 and 6 shows an RV sewage drainage system 50 according to one embodiment of the present invention. System 50 includes many of the same features of system 20 discussed above including drainage hose 24 having a first end mounted to the outlet of the sewage pipe 22 of RV 10 and a flexible portion 27 connecting a rigid sleeve pipe 56 to the RV proximate the sewage pipe 22. (See FIGS. 1–4). In this example, rigid sleeve pipe 56 includes a first, outer rigid pipe member 57 and a second, inner rigid pipe member 58 which is telescopically fitted within the first rigid pipe member. When stowed, hose 24 and pipe member 58 are pushed within outer pipe member 57 and a cap is place on the end of pipe member 57 (See FIG. 4). To use the system, the cap is removed and inner pipe member 58 can be pulled from outer pipe member 57 to increase the operative length of rigid pipe sleeve 56. One embodiment provides a cord 60 attached to inner pipe member 58 to pull the inner pipe from the outer pipe. The telescoping configuration allows for the use of the system when the sewage disposal system inlet port 17 is a farther distance from the RV 10. Thus, telescoping rigid sleeve pipe 56, along with flex hose 27, provide support for drainage hose 24 along its length from the RV to waste port 17. If the port 17 is even farther away, drainage hose 24 can be pulled out from pipe 58, stretching or expanding along its longitudinal axis.

In this example, inner pipe member 58 include a slot 59 along the length of pipe 58. Slot 59 provides stress relief when pulling inner pipe 58 out of outer pipe 57, or when pushing it back in. In one example, both of pipes 57 and 58 are approximately 4 feet in length. In another example, the outer pipe 57 is 42 inches long and the inner pipe 58 is 30 inches long. However, the length of either can be varied according to need. In use, sleeve pipe 56 is first removed from the stowed position and the cap is removed from its distal end, similarly as described above for system 20. Then, if necessary, inner pipe 58 is pulled from the end of outer pipe 57 along with drainage hose 24. The drain elbow on the distal end of drainage hose 24 is connected to waste port 17, and the RV waste is drained, as discussed above.

Figure 7:
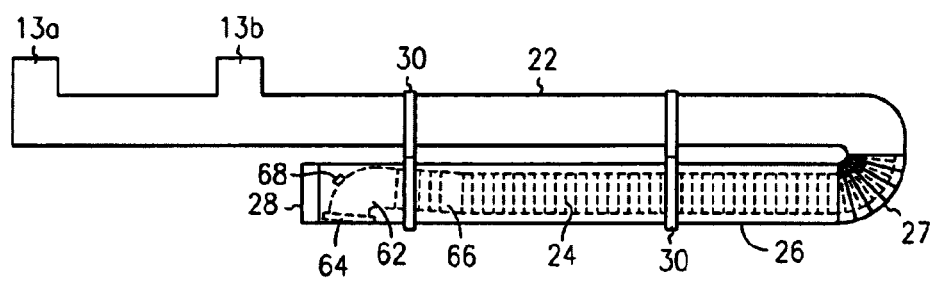
FIG. 7 shows a drainage system according to one embodiment.

FIG. 7 shows further details of an embodiment of a sewage disposal system. The embodiment of FIG. 7 includes similar features of the examples above and certain details will be omitted for sake of brevity. This embodiment includes sewage pipe 22 to receive sewage from either outlet port of the sewage tanks through respective valves 13A or 13B. The system also includes flexible and stretchable drainage hose 24 connected on a proximate end to the distal end of sewage pipe 22. Hose 24 is supported by a support member such as a rigid hose sleeve pipe 26 (shown in cut-away view). In one example, sleeve pipe 26 is hingedly or pivotably mounted on one end proximate the end of fixed position pipe 22 to allow it to move freely between a stowed or carrying position such as illustrated in FIG. 7, and a tank drainage or extended position such a shown in FIG. 1. The proximate end of the hose sleeve pipe 26 is fastened to the distal end of the sewage pipe with flexible portion or section 27, as discussed above. One or more holders, such as carrying brackets 30 are provided so that hose sleeve pipe 26 can be stowed alongside and proximate to sewage pipe 22. In some embodiments, a telescoping sleeve pipe, such as pipe 56 (FIG. 5) can be used.

A cap 28 is provided to close up the end of hose sleeve pipe 26 when it is stowed. The distal end of hose 24 includes a spout, such as elbow 62. A cap 64 with an o-ring is removably coupled over an opening on the end of elbow 62. Hose 24 along with elbow 62 fit entirely inside pipe 26. Elbow 62 is dimensioned to tightly fit within pipe 26 so that when the hose and elbow are placed inside of pipe 26, cap 64 is tightly pressed against the elbow opening since a top surface of elbow 62 contacts a top inner surface of pipe 26 and cap 64 is pressed against an opposite inner wall of pipe 26. This prevents any leakage from the system. Moreover, by tightly sealing the elbow with cap 64 and sealing the end of pipe 26 with cap 28, leaks are virtually eliminated.

In one embodiment, hose 24 further includes a window or viewing section 66. Viewing section 66 can be a clear plastic section that is disposed towards the proximal end of hose 24. Viewing section 66 allows a user to see inside hose 24 as sewage is being delivered through the hose. This enables the user to know when the line is clear. In one embodiment, viewing section 66 can be a clear annular window inserted into the length of hose 24 and having each end coupled to the hose such that fluids flowing through hose 24 also flow through the annular window and are therefore viewable through the window.

Elbow 62 also includes a backwash port 68. Port 68 can include a removable cap and threads allowing a hose to be attached at the port. The hose then delivers water through the port and into hose 24 to clean the hose after use.

In operation, hose sleeve pipe 26 carries, supports and protects flexible hose 24, including elbow spout 62, when stowed using brackets 30. When it is desired to empty the sewage tanks 12 and 14 (FIG. 1), sleeve pipe 26 is lifted or moved away from brackets 30 and the free or distal end swung outwardly from the RV toward a sewer drop. In some embodiments, a second supporting pipe is telescoped within pipe 26 and pulled out as discussed above. When the distal end of sleeve pipe 26 is near the drop, end cap 28 is removed from pipe 26 and hose 24 is pulled out from pipe 26, stretching or expanding along its longitudinal axis. Cap 64 is taken off of spout 62 and the distal end of the spout is placed on the sewer drop or inlet port of a sewage disposal system. The sewage tanks are then emptied by opening valves 13A and 13B. The user can watch through viewing section 66 to determine when the tanks are empty. After being emptied, the user can optionally backwash the hose 24 using the backwash port 68 as discussed above by coupling a water hose to the backwash port. After emptying the sewage system, cap 64 is placed on the end of the spout 62 and the spout 62 and hose 24 are inserted back into pipe 26 and cap 28 is placed over the end of pipe 26.

Thus, the invention as described above provides for quick and relatively easy emptying of the sewage tanks of an RV. Because the drainage hose 24 can be continually connected to discharge pipe 22 and is largely contained and supported in the sleeve pipe, it is readily deployed and readily stowed and the need to handle it is greatly reduced as compared to systems in which the hose is stowed in a compartment of the RV and has to be handled extensively during the process of emptying sewage tanks by connecting and disconnecting it to the RV and finding some technique to support it.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. An apparatus, comprising:
   a flexible drainage hose extending from a distal end of a sewage pipe on an RV, the flexible drain hose including an elbow spout on a distal end of the drain hose, the elbow spout having a removable cap over an opening of the elbow spout; and
   a rigid sleeve for carrying the drainage hose and spout in a first, stowed position in which the hose is fully contained in the sleeve while still being connected to the distal end of the sewage pipe, wherein the rigid sleeve is movably attached to the RV for supporting the drainage hose in a second, drainage position in which the hose extends in part from a distal end of the sleeve to reach a sewer drop;
   wherein when the flexible drainage hose and spout are in the stowed position, the cap of the elbow spout is forced against the opening of the elbow spout by a wall of the rigid sleeve.

2. The apparatus of claim 1, wherein the cap includes an o-ring.

3. The apparatus of claim 1, further including a cap over the end of the rigid sleeve.

4. The apparatus of claim 1, wherein the rigid sleeve includes a rigid outer sleeve and an inner pipe sleeve telescopically fitted within the outer pipe sleeve.

5. The apparatus of claim 1, wherein the rigid sleeve is fastened proximate the distal end of the sewage pipe by a flexible portion.

6. An apparatus, comprising:
   a flexible and extendable drainage hose extending from and connected to a distal end of a sewage pipe on an RV;
   an elbow spout disposed at a distal end of the drainage hose, the elbow spout including a backwash port;
   a support member for carrying the drainage hose in a first, stowed position in which the hose and spout are fully contained in the support member while still being connected to the distal end of the sewage pipe, wherein the support member includes:
      a flexible section attached to the RV and completely surrounding the drainage hose, and
      a rigid sleeve attached to a distal end of the flexible section for supporting the drainage hose wherein the rigid sleeve is movably attached to the RV by the flexible section for supporting the drainage hose along a substantial length of the drainage hose in a second, drainage position in which the hose extends in part from a distal end of the sleeve to reach a sewer drop;
   a first cap coupled to a distal end of the elbow spout;
   a second cap coupled to a distal end of the rigid sleeve, wherein the cap retains the drainage hose and spout within the support member; and
   one or more brackets mounted to the RV to hold the rigid sleeve when the support member is carrying the drainage hose in the stowed position.

7. The apparatus of claim 6, wherein the drainage hose includes a viewing section near a distal end of the hose.

8. The apparatus of claim 6, wherein when the flexible drainage hose and spout are in the stowed position, the cap of the spout is forced against the opening of the spout by an inside surface of the pipe.

* * * * *